(12) United States Patent
Inoue

(10) Patent No.: US 6,489,051 B1
(45) Date of Patent: Dec. 3, 2002

(54) CARBON FIBER PAPER FOR SOLID POLYMER FUEL CELLS

(75) Inventor: Mikio Inoue, Shiga-ken (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/446,414

(22) PCT Filed: May 27, 1998

(86) PCT No.: PCT/JP98/02331
§ 371 (c)(1),
(2), (4) Date: Dec. 20, 1999

(87) PCT Pub. No.: WO99/62134
PCT Pub. Date: Dec. 2, 1999

(51) Int. Cl.[7] .......................... H01M 8/10; H01M 2/00; H01M 2/02; H01M 2/14; H01M 4/60

(52) U.S. Cl. .............................. 429/34; 429/30; 429/38; 429/212

(58) Field of Search .............................. 429/34, 38, 30, 429/212

(56) References Cited

U.S. PATENT DOCUMENTS

| 3,998,659 A | | 12/1976 | Wakefield | |
|---|---|---|---|---|
| 3,998,689 A | * | 12/1976 | Kitago et al. | 162/36 |
| 4,459,342 A | * | 7/1984 | Shigeta et al. | 429/34 |
| 4,461,813 A | * | 7/1984 | Shirogami et al. | 429/34 |
| 4,759,989 A | * | 7/1988 | Abe et al. | 428/408 |
| 5,672,438 A | * | 9/1997 | Bannerjee et al. | 429/33 |
| 5,698,341 A | * | 12/1997 | Tamaki et al. | 429/218 |
| 6,010,606 A | * | 1/2000 | Denton et al. | 204/284 |

FOREIGN PATENT DOCUMENTS

| JP | 7-57741 | 3/1995 |
|---|---|---|
| JP | 9-157072 | 6/1997 |

* cited by examiner

Primary Examiner—Patrick Ryan
Assistant Examiner—Julian A. Mercado
(74) Attorney, Agent, or Firm—Morrison & Foerster LLP

(57) ABSTRACT

The present invention provides carbon fibre paper for use as current collectors for a polymer electrolyte fuel cell.

Specifically, it relates to a carbon fibre paper in a polymer electrolyte fuel cell in a state where short carbon fibres are bound with a polymer material and, taking the thickness as X mm, the thickness at the time of 2.9 MPa applied pressure as Y mm and the length of the short carbon fibre as W mm, at least 95% of the short carbon fibres excluding those of length (Y+0.1) mm or less satisfy the relation $W \geq 5X$. Taking the average length as Z mm, it is also preferred that the relation $Z \geq 5X$ also be satisfied, and the short carbon fibre diameter D ($\mu$m), tensile strength $\sigma$ (MPa) and tensile modulus (E) satisfy the following relation:

$\sigma/(E \times D) \geq 0.5 \times 10^{-3}$.

20 Claims, 1 Drawing Sheet

CARBON FIBER PAPER FOR SOLID POLYMER FUEL CELLS

TECHNICAL FIELD

The present invention relates to carbon fibre paper which is used as the current collector of a polymer electrolyte fuel cell.

TECHNICAL BACKGROUND

In addition to a current collecting function the current collectors of a polymer electrolyte fuel cell need to allow diffusion/permeation of the substances which participate in the electrode reactions. Furthermore, the material from which the current collectors are composed needs to possess electroconductivity and the strength to withstand gas diffusion/permeation and handling, and also the strength to withstand compression at the time of electrode production and during cell assembly, etc. When compared to the characteristics demanded of tile current collectors for a phosphoric acid fuel cell, in the case of the current collector of a polymer electrolyte fuel cell the strength of the polymer electrolyte membrane is high so the strength of the current collectors need only be enough to withstand handling, Furthermore, the corrosion resistance need only be low, so the polymer material selection range is broad. However on the other hand, since the strength and resistance of the polymer electrolyte membrane is high, its thickness is reduced, so it is necessary that there be no projecting regions in the current collectors which could cause a short circuit through the polymer electrolyte membrane. Additionally, since the polymer electrolyte membrane the catalyst layers and current collectors are usually coupled together by application of pressure, it is necessary that the current collectors be undamaged, not merely by the applied pressure at the time of cell assembly but also by the pressure at the time of the integral coupling, and it is necessary that a short circuit does not occur through the polymer electrode membrane.

As the material used for the current collectors of such a polymer electrolyte fuel cell, there is known a porous carbon sheet formed by binding together short carbon fibre with carbon, as described in Japanese Unexamined Patent Publication (Kokai) Nos 6-20710, 7-326362 and 7-220735. However, since such porous carbon sheet is produced by firstly preparing an aggregate of short fibre comprising carbon fibre or carbon fibre precursor fibre, then impregnating or mixing with resin and firing, the production costs are high. Again, in the case where the density is low, there is also the problem that the binding carbon is readily damaged by the pressure applied at the time of electrode production or cell assembly.

The use of a paper-form short carbon fibre aggregate as a current collector is proposed in Japanese Unexamined Patent Publication (Kokai) No. 7-105957 as a method for resolving the problem of production costs. With such a current collector since binding with carbon is not carried out, it is necessary to apply a thickness direction pressure not just at the time of the integral coupling of the polymer electrolyte, catalyst layers and current collectors, but also when used as a cell in order to lower the electrical resistance in the thickness direction. However, in these inventions, no consideration is given to the lowering of the resistance or to preventing damage to the current collector at the time of pressure application. Moreover, since the short carbon fibres are randomly arranged when pressure is applied at the time of the electrode production or cell assembly, short carbon fibres facing in the thickness direction readily pierce the polymer electrolyte membrane, bringing about a short circuit with the facing electrode, and breakage of the short carbon fibre also readily occurs. Again, in Japanese Unexamined Patent Publication (Kokai) No. 8-7897, there is described the adhesion of the short carbon fibre in a state of entanglement with carbon particles contained in the diffusion layer at the surface on the diffusion layer side of a coupled body comprising the electrolyte membrane forming the electrodes, the catalyst reaction layers and diffusion layers, but since the short carbon fibre is fixed by entanglement with carbon particles in the diffusion layer, the short carbon fibres emerging at the surface are all at an angle in the terms of the plane of the coupled body, and at the time of pressure application when assembling the cell the short carbon fibres readily pierce the polymer electrolyte membrane bringing about a short circuit with the facing electrode, and breakage of the short carbon fibre also readily occurs. Moreover, since the layer of short carbon fibre is thin, there is low gas diffusion/permeation in the planar direction of the layer, and it is necessary to provide a diffusion layer separately.

The present invention has been made in view of the aforementioned problems of the prior art and has as its objective to provide a carbon fibre paper for use as the current collectors in polymer electrolyte fuel cells where there is little concern about a short circuit with the facing electrode occurring, where there is little fear of damage by pressure application, where the resistance value is comparatively low and which is also cheap.

DISCLOSURE OF THE INVENTION

Specifically, the present invention is characterized in that it is a carbon fibre paper used in a polymer electrolyte fuel cell in a state in which short carbon fibres are bound with a polymer material and taking the thickness as X mm and the thickness when 2.9 MPa pressure is applied as Y mm, at least 95% of the short carbon fibres excluding those of length (Y+0.1) mm or less satisfy the relation W≧5X.

Taking the length of the short carbon fibre as W mm and the average length of the short carbon fibre excluding fibre of length (Y+0.1) mm or less as Z mm, the aforesaid carbon fibre paper preferably satisfies the relation Z≧5X.

Furthermore, it is preferred that the short carbon fibre be substantially randomly oriented within a two dimensional plane.

Moreover, preferably the relation between the short carbon fibre diameter D ($\mu$m), the tensile strength a (MPa) and the tensile modulus E (MPa) satisfies the following relation.

$$\sigma/(E \times D) \geq 0.5 \times 10^{-3}$$

Additionally, it is preferred that the average length of the short carbon fibre be at least 4.5 mm and at least seven times the thickness of the carbon fibre paper, and that the following relation be satisfied.

$$\sigma/(E \times D) \geq 1.1 \times 10^{-3}$$

Furthermore, it is preferred that the short carbon fibre be short fibre of polyacrylonitrile-based carbon fibre, and it is preferred that the diameter of this short carbon fibre be no more than 20 $\mu$m and that the volume resistivity in the short carbon fibre lengthwise direction be no more than 200 $\mu\Omega$.m.

Again it is preferred that the reduction in weight be no more than 3% when a uniform pressure of 2.9 MPa is applied in the thickness direction for 2 minutes and then the pressure removed.

Moreover, it is preferred that the resistance be no more than 50 $\mu\Omega.cm^2$ when a uniform pressure of 2.9 MPa is applied.

It is also preferred that the thickness is 0.02 to 2.0 mm and that the density lies in the range 0.3 to 0.8 g/cm$^3$ when a uniform pressure of 2.9 MPa is applied in the thickness direction, and it is preferred that the weight per unit area be in the range 10 to 100 g/m$^2$.

Additionally, it is preferred that the polymer material content lies within the range 2–30 wt % and it is preferred that fine carbon particles also be included.

With regard to the current collector employing the carbon fibre paper of the present invention, individual units are constructed by arranging the current collector and catalyst layer in the form of layers, and the polymer electrolyte fuel cell is constructed from a stack containing a plurality of such units, and a moving body such as a motor vehicle or the like may be driven by means of this polymer electrolyte fuel cell.

A current collector employing the carbon fibre paper of the present invention is produced, for example, by a method containing a stage in which, prior to the formation of the catalyst layer on the current collector, the carbon fibre paper is simultaneously heated and pressure applied perpendicular to the plane of the carbon fibre paper, and preferably, prior to the formation of the catalyst layer on the current collector, the carbon fibre paper is brought into contact with a liquid and the pressure applied in a state with the carbon fibre paper soaked with liquid.

Figure 1:
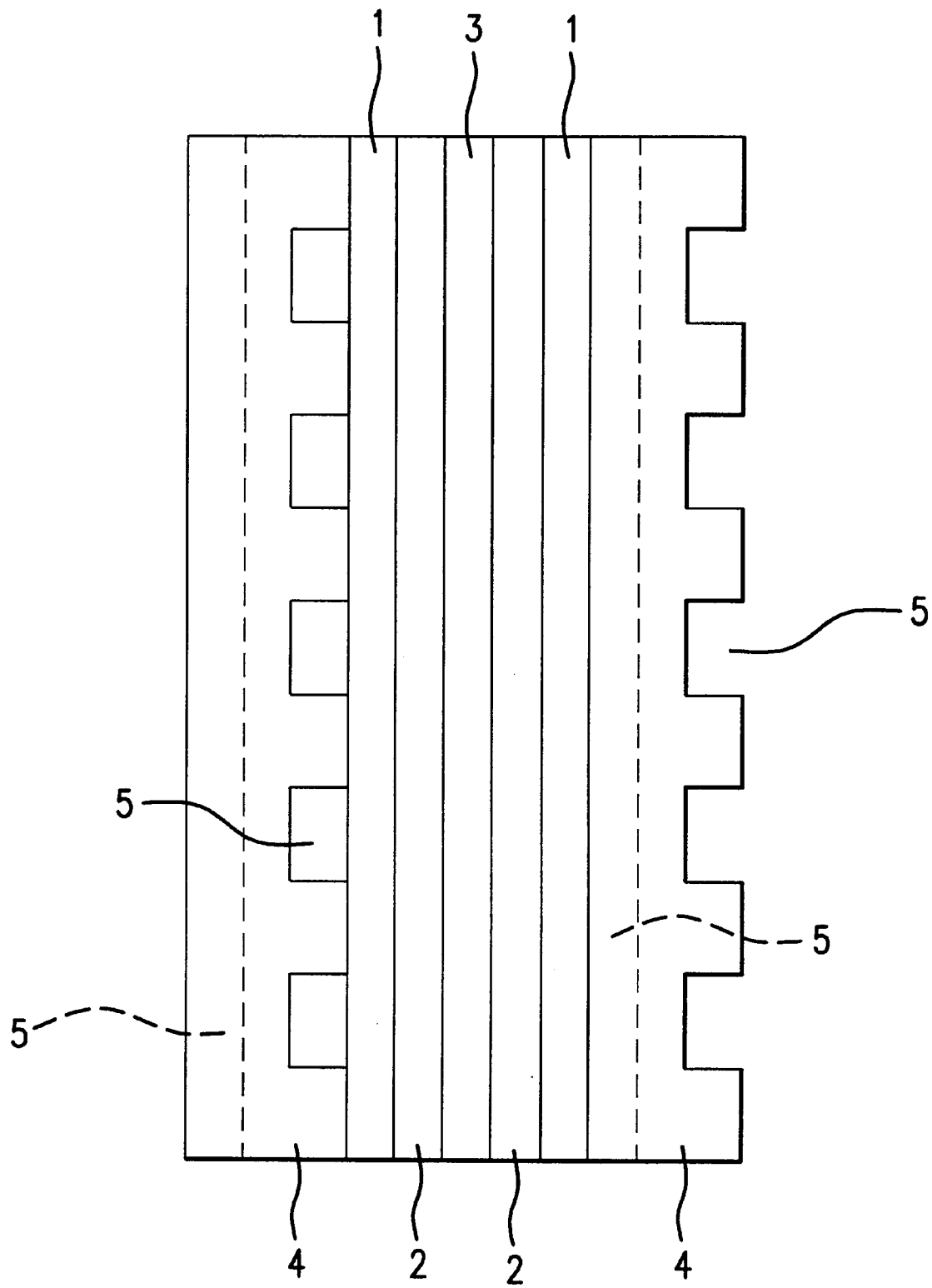
FIG. 1 is a side view of a polymer electrolyte type fuel cell relating to an embodiment of the present invention.

Explanation of the numerical codes:
1: current collector
2: catalyst layer
3: polymer electrolyte membrane
4: separator
5: groove

OPTIMUM FORM FOR PRACTISING THE INVENTION

The polymer electrolyte fuel cell in the present invention is a fuel cell which uses a polymer electrolyte membrane as the electrolyte, and an example thereof is shown in FIG. 1. FIG. 1 illustrates a single cell comprising respectively sheet-shaped current collectors 1, catalyst layers a and polymer electrolyte membrane 3, and the fuel cell is produced by stacking a plurality of such single cells via grooved separators 4. The catalyst layers are, for example, layers comprising carbon powder on which fine particles of a platinum type catalyst have been supported, bound together with a resin, and the thickness is about 0.02 to 0.2 mm. The catalyst layers may be impregnated or mixed with polymer electrolyte. Again, rather than being produced as sheet shapes on their own, it is better that the catalyst layers be formed on the polymer electrolyte membrane or on the current collectors. The polymer electrolyte membrane is for example a fluoropolymer type cation exchange resin, of thickness about 0.05 to 0.15 mm. The interface between the polymer electrolyte membrane and catalyst layer, or between the catalyst layer and current collector, may be produced by superposition or there may be intermingling and the interface need not necessarily be clearly delineated in the way indicated in FIG. 1. The separator is formed of an electroconductive gas-impermeable material such as a carbon plate an electroconductive plastic plate or the like and it has grooves 5 formed on both faces to produce channels for the fuel, air or water which is the electrode reaction product. In FIG. 1, at the left side face of the separator there is formed a groove in the lengthwise direction. Pressure is applied to the stacked plurality of single cells, in the stacking direction, at the time of operation of the fuel cell. The pressure us preferably from 0.5 to 10 MPa.

By binding the short carbon fibre with a polymer material, it is possible to enhance the strength and handling properties of the carbon fibre paper and it is also possible to prevent shedding of short carbon fibre and to prevent the fibre being directed in the carbon fibre paper thickness direction. Again, by binding with a polymer material, there is enhanced strength in terms of compression or stretch.

As methods for the application of the polymer material, there are the method of mixing a fibre-form, particle-form or liquid-form polymer material at the time of the production of the paper-shaped aggregate of short carbon fibres, and the method of applying a fibre-form, particle-form or liquid-form polymer material following the production of the paper-shaped aggregate of short carbon fibres. The concept of 'liquid-form' here includes materials such as emulsions, dispersions latexes and the like, were fine particles of a polymer material are dispersed in a liquid and which can essentially be handled as a liquid. In order to strengthen the binding of the short carbon fibre or in order to lower the electrical resistance of the carbon fibre paper, and hence of the current collector, it is preferred that the polymer material has a fibre-form, or be an emulsion, dispersion or latex. In the case there a fibre-form polymer material is employed, it is preferred that filament fibre be used to lower the amount employed.

The polymer material for binding the short carbon fibre is preferably a polymer material with carbon or silicon in the main chain, and there can be used thermoplastic resins such as polyvinyl alcohol (PVA), polyvinyl acetate, polyethylene terephthalate (PET), polypropylene (PP), polyethylene, polystyrene, polyvinyl chloride, polyvinylidene chloride, acrylic resins, polyurethanes and the like, thermosetting resins such as phenolic resins, epoxy resins, melamine resins, urea resins, alkyd resins, unsaturated polyester resins, acrylic resins, polyurethanes and the like, and also thermoplastic elastomers, butadiene/styrene copolymers (SBR), butadiene/acrylonitrile copolymers (NBR) and other such elastomers, cellulose, pulp or the like. By using a fluoropolymer or other such waterproof resin, the carbon fibre paper may be given a waterproofing treatment at the same time as the binding of the short carbon fibre.

In order that damage does not readily occur at the time of the application of pressure to the current collector, it is better that there be used a soft polymer material to bind the short carbon fibre and, in the case where there is used a fibre-form or particle-form polymer material, a thermoplastic resin, elastomer, rubber, cellulose or pulp is preferred. In the case where a liquid-form polymer material is employed, a thermoplastic resin, elastomer, rubber, or a thermosetting resin modified by means of such as soft material, is preferred, with a thermoplastic resin, elastomer or rubber being further preferred.

The polymer material preferably has an elastic modulus in compression at 23° C. of 4,000 MPa or less, more preferably 2,000 MPa or less, and still more preferably 1.000 MPa or less. A polymer material with a low elastic modulus in compression mitigates stresses applied to the binding regions and the binding does not readily fail. Again, stresses applied to the short carbon fibres are mitigated and the short carbon fibres do not readily break.

Moreover, in the case where the polymer material is a crystalline polymer material, its glass transition point (Tg) is preferably no more than 100° C., more preferably no more than 50° C. and still more preferably no more than 0° C. Above the glass transition point, the polymer material does not crystallize so it is comparatively soft, and the greater the temperature difference in respect of the glass transition point the softer it is. The glass transition point Tg of a copolymer is determined by the following formula.

$$1/Tg = W_1/Tg_1 + W_2/Tg_2 - \to W_n/Tg_n$$

Tg: glass transition point (K) of the copolymer
$W_n$: weight fraction of monomer n
$Tg_n$: glass transition point (K) of polymer formed by polymerization of monomer n In the case where water is used at the time of the processing of the undermentioned carbon fibre paper to produce the current collector or at the time of the coupling thereof, in order to prevent the polymer material which binds the short carbon fibre from dissolving in the water and the binding undergoing failure, it is preferred that a water-insoluble polymer material be used. Examples of water-insoluble polymer materials are polyvinyl acetate. PET, PP, polyethylene, polyvinylidene chloride, epoxy resin, unsaturated polyesters, SBR, NBR and the like. As a water-soluble polymer material, there can be used PVA but, in such circumstances, it is preferred that it be mixed with some other polymer material, or a PVA copolymer be used, or that PVA with a high degree of saponification be employed. The degree of saponification is preferably at least 85 mol %, and more preferably at least 95 mol %.

In the polymer electrolyte fuel cell, at the cathode (air electrode, oxygen electrode), there is generated water as the product of the electrode reaction and also water which has passed through the electrolyte. Furthermore, at the anode (fuel electrode), the fuel is supplied after moistening in order to prevent drying of the polymer electrolyte membrane. Since dewing or build-up of such water, or the swelling of the polymer material by the water, inhibits the supply of the electrode reactants, the water absorption of the polymer material should be low. Preferably it is no more than 20% and more preferably no more than 7%. Specifically, there is used PET, PP, polyethylene, polyvinylidene chloride, polystyrene, epoxy resin, unsaturated polyester, melamine resin, SBR, NSR or the like.

In order to prevent a lowering of the catalyst activity or a lowering of the electroconductivity of the polymer electrolyte membrane, there should be little impurity present In the polymer material. The weight ratio of metal elements other than alkali metals (Li, Na, K, Rb, Cs, Fr), alkaline earth metals (Be, Mg, Ca, Sr, Ba, Ra), boron (B) and silicon (Si) in the carbon fibre paper is preferably no more than 300 ppm, more preferably no more than 100 ppm and still more preferably no more than 50 ppm. Furthermore, the weight ratio of metal elements other than boron (B) and silicon (Si) is preferably no more than 1,000 ppm. more preferably no more than 700 ppm and still more preferably no more than 500 ppm. As specific examples of polymer materials with little impurity, there are PET, PP, polyethylene, polystyrene and the like. Again, in the case where an elastomer is mixed, it is preferable that there not be used a material which contains sulphur as a vulcanizing agent.

The carbon fibre paper may be employed as it is as the current collector, and it may also be used after post treatment. Examples of the post treatment are a waterproofing treatment in order to prevent a lowering of gas diffusion/permeation due to the retention of water, a partial waterproofing or a hydrophilic treatment to form a water discharge channel, or the addition of carbon to bring about a lowering of resistance.

Taking the length of the short carbon fibres as W mm, it is necessary that at least 95% of the short carbon fibres excluding those of length (Y+0.1) mm or less satisfy the relation $W \geq 5X$. More preferably this will be at least 98%, and still more preferably at least 99%. Again, $W \geq 7X$ is more preferred and $W \geq 12X$ is still further preferred. Where the value is less than 95%, then numerous short carbon fibres are disposed in the thickness direction of the carbon fibre paper, so that breakage of the short carbon fibres or short circuits due to penetration of the solid electrolyte membrane by the short carbon fibres occurs more readily. Here, the percentage of short carbon fibres is the numerical percentage.

The thickness X mm of the carbon fibre paper is measured based on JIS P8118. The pressure at the time of measurement is made 13 kPa. The thickness Y mm at the time of 2.9 MPa pressure application is determined following application of a uniform pressure of 2.9 Mpa, from the difference in spacing of top/bottom pressure plates when the current collector is or is not interposed. In the measurement of the pressure plate spacing, the spacing between the pressure plates is determined by means of a micro-displacement detector at two edges containing the centre point of the pressure plates, and the spacing calculated as the average of the spacings for the two edges. In order to apply a uniform pressure, one of the pressure plates is made to swivel so that the angle of the pressing faces of the top/bottom pressure plates is changeable. Short carbon fibre of length no more than (Y+0.1) mm may be arranged in any direction theedimensionally in the carbon fibre paper, but penetration of the polymer electrolyte membrane or breakage does not occur. From amongst such fibres, the short carbon fibres oriented in the carbon fibre paper thickness direction have the effect of conferring unevenness at the catalyst layer or solid electrolyte membrane when the carbon fibre paper is used as the current collector of a polymer electrolyte fuel cell and so the electrode reaction area is increased, or such fibres have the effect of lowering the current collector thickness direction resistance, so it is actually preferred that there be included short carbon fibre of length no more than (Y+0.1) mm.

With regard to the length of the short carbon fibre, taking the thickness of the carbon fibre paper as X mm, the thickness at the time of 2.9 MPa pressure application as Y mm, and the average length of the short zarbon fibre excluding fibre of length no more than (Y+0.1) mm as Z, the relationship $Z \geq 5X$ is preferably satisfied, more preferably $Z \geq 7X$ and still more preferably $Z \geq 12X$. In the case where $Z < 5X$, numerous short carbon fibres are directed in the carbon fibre paper thickness direction, so there readily occurs breakage of the short carbon fibre or a short circuit occurs due to penetration of the polymer electrolyte membrane by the short carbon fibre. Here, the average length employed is that based on the numerical average.

The meaning of the expression 'the short carbon fibre is substantially oriented within a two dimensional plane' is that the short carbon fibres are mostly lying flat. In this way, it is possible to prevent a short circuit with the opposite electrode due to the short carbon fibre or breakage or the short carbon fibre.

As methods for ensuring that the short carbon fibre is substantially oriented within a two dimensional plane, there are the wet method whereby short carbon fibre is dispersed in a liquid medium and papermaking carried out, and the dry method in which the short carbon fibre is dispersed in air and deposited as a pile. The wet method is preferred for reliably ensuring that the short carbon fibre is substantially oriented within a two dimensional plane and for increasing the strength of the carbon fibre paper.

In order to enhance the strength and handling properties of the carbon fibre paper, it is preferred that there be present at least 30% of short carbon fibre of length at least 4 mm and preferably of length at least 6 mm. More preferably, there will be at least 50% and still more preferably at least 70%.

In order that the short carbon fibre be dispersed within a two dimensional plane, the upper limit of length will be no more than 30 mm, more preferably no more than 15 mm and still more preferably no more than 8 mm. If the short carbon fibre is too long, then dispersion irregularities will readily arise. With regard to the dispersion irregularities, in the case for example where numerous short carbon fibres remain bunched together, the porosity in these bunched regions lowered, the thickness when pressure is applied is increased and so a higher pressure is employed at the time of pressure application, and therefore problems readily tend to arise such as damage to the carbon fibre paper, or localized thinning of the polymer electrolyte membrane or catalyst layer.

Again, it is preferred that the short carbon fibre be of a linear shape. If the length (L) of the short carbon fibre in its lengthwise direction is determined in a state free of external forces causing banding of said short carbon fibre, and the maximum divergence (Δ) between this length (L) and linearity is measured, then providing Δ/L is broadly no more than 0.1, than the short carbon fibre may be regarded as linear. If the short carbon fibre is linear, then it is possible to prevent more completely short-circuits occurring with the opposite electrode due to the carbon fibre. Non-linear short carbon fibre readily tends to be directed in three dimensions instead of being substantially randomly oriented in a two-dimensional plane.

The short carbon fibre included in the carbon fibre paper should satisfy the relation given below between the diameter D ($\mu$m), the tensile strength $\sigma$ (MPa) and the tensile modulus E (MPa). Carbon fibre paper comprising such short carbon fibre is not readily damaged. In other words, the short carbon fibre does not readily break where the diameter of the short carbon fibre is low, the tensile strength high and the tensile modulus low, and the carbon fibre paper or a current collector employing the carbon fibre paper is not readily damaged at the time of pressure application.

$$\sigma/(E \times D) \geq 0.5 \times 10^{-3}$$

Here, the tensile strength and the tensile modulus of the carbon fibre are measured based on JIS R7601. In the case where the carbon fibre has a flattened cross-section, the average value of the major and minor axes is taken as the diameter. In cases where short carbon fibres of different types are mixed together, weight-averaged values of D, $\sigma$ and E respectively are employed. Preferably, $\sigma/(E \times D) \geq 1.1 \times 10^{-2}$, and more preferably $\sigma/(E \times D) \geq 2.4 \times 10^{-3}$.

The tensile breaking elongation of the short carbon fibre is preferably at least 0.7%, more preferably at least 1.2% and still more preferably at least 1.8%. Short carbon fibre of tensile breaking elongation less than 0.7% is readily broken. The tensile breaking elongation is the value of the tensile strength ($\sigma$) divided by the tensile modulus (E).

Again, since breakage of the short carbon fibre arises under various circumstances, the tensile strength of the short carbon fibre is preferably at least 500 MPa, more preferably at least 1,000 MPa and still more preferably at least 2,000 MPa.

Moreover, it is preferred that the average length of the short carbon fibre be at least 4.5 mm and that it is at least seven times the thickness of the carbon fibre paper, and also that the diameter D ($\mu$m) of the short carbon fibre, the tensile strength $\sigma$ (MPa) and the tensile modulus E (MPa) satisfy the following relation.

$$\sigma/(E \times D) \geq 1.1 \times 10^{-3}$$

With such carbon fibre paper, short circuiting of the polymer electrolyte layer, breakage of the short carbon fibre and damage to the carbon fibre paper do not readily occur, and the handling properties are excellent, so it is ideal for use as the current collector of a polymer electrolyte fuel cell.

The carbon fibre paper preferably shows a weight reduction of no more than at when a uniform pressure of 2.9 MPa is applied in the thickness direction for two minutes and then the pressure removed. Thus, the carbon fibre paper is not readily damaged when pressure is applied and it is possible to prevent a shortening of the fuel cell life due to damage to the current collector employing the carbon fibre paper.

The current collector employing the carbon fibre paper is subjected to pressure in the thickness direction at the time of the coupling of the polymer electrolyte membrane. the catalyst layers and the current collectors, and also when used as a fuel cell, so damage may occur. Again, when used as a cell, pressure is applied in the thickness direction in a state facing the grooved separators, so along with the fact that a high pressure is applied to those regions facing the projecting parts of the grooved separators, those regions facing the boundaries between the projecting and depressed parts are also readily damaged. If the current collector is damaged, shedding of broken short carbon fibres occurs, and a lowering in the current collector strength and a raising of the electrical resistance in the planar direction are brought about, and sometimes use as a cell is no longer possible. In order to prevent this from happening due to the is shedding of broken short carbon fibres and a lowering of the strength of the current collector, etc, it is necessary that the weight reduction is no more than 3% when a uniform pressure of 2.9 MPa is applied in the thickness direction for two minutes and then the pressure removed. Preferably the weight reduction is no more than 2% and still more preferably no more than 1%. With carbon fibre paper where the weight reduction is more than 3%, there is a weakening following the removal of the pressure and it tends to be damaged by handling.

The measurement of the weight reduction is carried out as follows. Firstly, the carbon fibre paper is cut to a circular shape of diameter 46 mm, and the weight measured. Next, the cut carbon fibre paper is sandwiched between two glassy carbon plates of size larger than the carbon fibre paper and having a smooth surface, then a pressure of 2.9 MPa is applied over the area of the carbon fibre paper, and held for 2 minutes. Subsequently, the pressure is removed and the carbon fibre paper taken out. It is then dropped from a height of 30 mm with its planar direction perpendicularly disposed. After dropping in this way ten times, the weight is measured and the reduction in weight calculated.

In order to prevent breakage of the short carbon fibre and keep the level of weight reduction to below 3%, it is preferred that the short carbon fibre employed be fibre produced by the cutting of continuous carbon fibre. It is further preferred that tension be applied at the time of the fibre heat treatment and it is still further preferred that the fibre be stretched at the time of the heat treatment. The carbon fibre used may a polyacrylonitrile (PAN) based carbon fibre, phenolic resin based carbon fibre or pitch based carbon fibre. Of these, the PAN based carbon fibre is preferred. When compared to pitch based carbon fibre. PAN based carbon fibre has a higher compression strength and tensile breaking elongation, and it breaks less readily. This is thought to be due to the difference in the crystallization of the carbon from which the carbon fibre is composed. In order to obtain carbon fibre which does not readily break, the heat treatment temperature of the carbon fibre is preferably no more than 2,500° C. and more preferably no more than 2,000° C.

The diameter of the short carbon fibre which is contained in the carbon fibre paper is preferably no more than 20 μm. More preferably it is no more than 12 μm and still more preferably no more than 8 μm. At the surface of the carbon fibre paper contained in the current collector, gaps of diameter 5 to 10 times the diameter of the short carbon fibre are observed. At the time of the integral coupling with the catalyst layers, the faces of the polymer electrolyte membrane, the catalyst layers and the current collectors are made uneven by the short carbon fibre and by the gaps at the surface of the current collectors employing the carbon fibre paper, and so the electrode reactions are facilitated. Hence, the diameter of the short carbon fibre should be low. If the diameter exceeds 20 μm, the radius of the gaps in the carbon fibre paper surface contained in the current collector is about the same as the thickness of the catalyst layer, and there is a lengthening of the distance of electron flow between the catalyst particles in the catalyst layers and the short carbon fibres in the carbon fibre paper. Again, the finer the short carbon fibre, the less readily it breaks when pressure is applied in the thickness direction. When short carbon fibres of different diameters are used, the diameter is determined by means of the weight average. On the other hand, if the diameter of the short carbon fibre is too fine, ingress by the catalyst layer into the current collector occurs less readily at the time of the integral coupling, so a short carbon fibre diameter of at least 2 μm is preferred.

The volume resistivity of the carbon fibre contained in the carbon fibre paper is preferably no more than 200 μΩ.m, more preferably no more than 50 μΩ.m, and still more preferably no more than 15 μΩ.m. The measurement of the volume resistivity of the carbon fibre is carried out based on JIS R7601. Where the prescribed fibre length is not obtained, the measurement is carried out at the obtained fibre length.

The resistance when a uniform pressure of 2.9 MPa is applied to the carbon fibre paper is preferably 50 mΩ.cm² or below. More preferably it is 40 mΩ.cm² or below and still more preferably 20 mΩ.cm² or below.

In the measurement of the resistance, there are prepared two sheets comprising copper foil of width 50 mm, length 200 mm and thickness 0.1 mm superimposed on a glassy carbon plate with a smooth surface, of width 50 mm. length 200 mm and thickness 0.15 mm. These are referred to as the test electrodes. The two test electrodes are placed one on the other so that they cross in the central region, with the glassy carbon plates facing one another. The carbon fibre paper is cut to a circular shape of diameter 46 mm, interposed in the region where the glassy carbon plates overlap and pressure applied to these glassy carbon plates so as to give a pressure of 2.9 MPa over the area of the carbon fibre paper.

Current terminals are provided at one end in the lengthwise direction of each of the plates and voltage terminals are provided at the other end. Using the current terminals, a current of 1 A is passed between the two test electrodes. The voltage v (V) is measured between the voltage terminals and the resistance R (mΩ.cm²) calculated by means of the following formula. Here, π is the circular constant pi.

$$R = V \times 2.3 \times 2.3 \times \pi \times 1000$$

In order to lower the resistance, the carbon fibre heat treatment temperature is preferably at least 800° C. and more preferably at least 1000° C.

The carbon fibre paper preferably has a thickness of 0.02 to 0.2 mm when a uniform pressure of 2.9 MPa is applied in the thickness direction. More preferably, it is from 0.04 to 0.16 mm and still more preferably from 0.08 to 0.12 mm. If it is less than 0.02 mm, the current collector employing the carbon fibre paper is buried in the catalyst layer, and the diffusion/permeation of the fuel or oxygen in the planar direction is lowered. If the thickness is greater than 0.2 mm, then the electrical resistance in the thickness direction is increased.

Carbon fibre paper of the aforesaid thickness when a uniform pressure of 2.9 MPa is applied in the thickness direction preferably has a thickness of 0.1 to 2.0 mm and more preferably 0.2 to 1.2 mm measured at a pressure of 13 kPa. If it is more than 2 mm, then the carbon fibre paper has high bulk, and short carbon fibre is directed in the thickness direction and the strength of the carbon fibre paper is weakened. In order to make the thickness less than 0.1 mm, it is necessary to carry out firm binding of the short carbon fibre with a considerable amount of polymer material.

The carbon fibre paper preferably has a density of 0.3 to 0.8 g/cm³ when a uniform pressure of 2.9 MPa is applied in the thickness direction. More preferably this is 0.35 to 0.7 g/cm³ and still more preferably 0.4 to 0.6 g/cm³. The density of the carbon fibre paper when a uniform pressure of 2.9 MPa is applied in the thickness direction is determined by calculation from the weight per unit area of the carbon fibre paper and the thickness of the carbon fibre paper when a uniform pressure of 2.9 MPa is applied in the thickness direction.

It is sometimes necessary to raise the porosity in order to increase the diffusion/permeation properties of the current collector. If the density is greater than 0.8 g/cm³ when a uniform pressure of 2.9 MPa is applied in the thickness direction, the porosity is too low and the diffusion/permeation properties are inadequate. Again, if it is less than 0.3 g/cm³, then the resistance value in the thickness direction is increased.

The carbon fibre paper preferably has a pressure loss of no more than 10 mmAq when air is allowed to permeate at 14 cm/sec in the thickness direction in a state with no pressure applied. More preferably, this is no more than 3 mmAq, with no more than 1 mmAq still further preferred.

The weight per unit area of the carbon fibre paper is preferably from 10 to 100 g/m2. More preferably it is from 20 to 80 g/m² and still more preferably 25 to 60 g/m². At less than 10 g/m², not only is the strength of the carbon fibre paper low but also there is thinning of the current collector when the polymer electrolyte membrane, the catalyst layers and the current collectors are integrally coupled and at the time of cell assembly, and the current collector is buried in the catalyst layer so that the diffusion/permeation effect in the planar direction is inadequate. If it exceeds 100 g/m², when assembled as a cell the current collector is thick and resistance increased.

The carbon fibre paper preferably includes fine carbon particles in order to lower the resistance. The particle size of the fine carbon particles is preferably no more than 3 μm, more preferably no more than 0.5 μm and still more preferably no more than 0.1 μm. Carbon particles of large particle size have little effect in lowering the resistance and they reduce the diffusion properties. They also readily drop away from the current collector. As examples of the carbon particles, there are carbon black, graphite powder and the like. Methods for incorporating the carbon particles include the method of binding the short carbon fibres by means of a polymer material containing fine carbon particles and the method of affixing the fine carbon particles and the short carbon fibres by means of a polymer material. Binding the fine carbon particles to the carbon fibre paper by means of a polymer material is also preferred.

Now, the polymer electrolyte fuel cell unit includes at least a current collector employing the aforesaid carbon fibre paper and a catalyst layer, and short circuits through the polymer electrolyte membrane or damage to the current collector do not readily occur. As the catalyst layer, there is used for example carbon powder an which the catalyst has been supported, bound together with a fluoropolymer, and this is usually integrally coupled to the current collector by coating or by press bonding. Between the catalyst layer and the current collector there may be provided a diffusion layer of carbon powder bound by a resin, but not providing a diffusion layer and instead thickening the current collector to a certain extent so that it jointly functions as a diffusion layer by providing gas diffusion/permeation properties in the planar direction as well as the thickness direction is preferred in terms of simplifying the production process.

The unit preferably has an integral structure. The application of pressure is preferred either at the time of the integral coupling or subsequent thereto, and simultaneous pressure application and heating is preferred. Carrying out simultaneous pressure application and beating is particularly effective in the case of integral coupling inclusive of the polymer electrolyte membrane. Tho pressure applied is preferably 0.1 to 20 MPa, with 0.5 to 10 MPa further preferred and 1.5 to 7 MPa still further preferred. The heating temperature is preferably from 50 to 250° C. more preferably from 80 to 200° C. and still more preferably from 120 to 180° C. By integral coupling, the contact resistance is lowered and, furthermore, as a result of the catalyst layers and polymer electrolyte membrane being roughened, there is the effect of lowering resistance, improving contact between the catalyst layer and the electrolyte membrane and raising the catalyst utilization, and by shortening the distance from the current collector to the fine catalyst particles within the catalyst layer there is the effect that the electron transfer distance, and the hydrogen, oxygen and water supply/discharge routes, are shortened, so that the electrode reactions occur more readily. With this unit, there is the effect that short circuits through the polymer electrolyte membrane and current collector damage are prevented when used as a fuel cell, but in the case when the integral coupling is performed by pressure application there is also the effect that short circuits through the polymer electrolyte membrane and current collector damage due to this pressure applied at the time of integral coupling is prevented. Where heating is carried out at the same time as the pressure application at the time of the integral coupling, the polymer electrolyte membrane is softened and the risk of a short circuit through the polymer electrolyte membrane is increased, so the effects of preventing short circuits through the polymer electrolyte membrane are more markedly exhibited.

A polymer electrolyte fuel cell with current collectors or units employing the carbon fibre paper of the present invention shows excellent properties due to the aforesaid effects, and it is also an inexpensive polymer electrolyte fuel cell, so is ideal for driving moving bodies such as cars, trains, boats and the like.

In the production of a current collector employing carbon fibre paper, the method where there is included, prior to the formation of the catalyst layer on the current collector, a stage in which pressure is applied in the direction perpendicular to the carbon fibre paper face at the same time as the heating of the carbon fibre paper causes the short carbon fibres to be oriented in a two dimensional fashion, and is an effective method for preventing short circuits due to penetration of the polymer electrolyte membrane and breakage of the short carbon fibres.

Moreover, in the production thereof, the method of applying pressure in a state with the carbon fibre paper soaked with liquid gives still more outstanding effects.

EXAMPLES

Example 1

Carbon fibre paper was obtained by dispersing in water short PAN-based carbon fibre which had been cut to length 12 mm, then subjecting the dispersion to a paper-making process on a metal mesh, applying an emulsion comprising a mixture of polyvinyl acetate and PVA, which is a polymer material for binding the short carbon fibre, and drying. The carbon fibre paper, and the short carbon fibre and polymer material used, are shown at the end of Table 1.

Examples 2 to 4

Carbon fibre paper was obtained in the same way as in Example 1, excepting that the weight per unit area, or the weight per unit area and the polymer content, was/were altered. The carbon fibre paper, and the short carbon fibre and polymer material used, are shown in Table 1.

Examples 5 to 8

Carbon fibre paper was obtained in the same way as in Example 2, excepting that the short carbon fibre was changed to a different PAN-based short carbon fibre. The carbon fibre paper, and the short carbon fibre and polymer material used, are shown in Table 1.

Example 9

Carbon fibre paper was obtained in the same way as in Example 2, excepting that there was used an SBR emulsion as the polymer material for binding the short carbon fibre. The carbon fibre paper, and the short carbon fibre and polymer material used, are shown in Table 1.

Examples 10 and 11

Carbon fibre paper was obtained in the same way as in Example 9, excepting that the weight per unit area, or the weight per unit area and the polymer content, was/were altered. The carbon fibre paper, and the short carbon fibre and polymer material used, are shown in Table 1.

Examples 12 to 15

Carbon fibre paper was obtained by dispersing, in water, PAN-based short carbon fibre and short fibre of a polymer material which binds the short carbon fibre, and then subjecting the dispersion to a paper-making process on a metal mesh, followed by drying and binding by heating while applying slight pressure. The carbon fibre paper, and the short carbon fibre and polymer material used, are shown in Table 1.

Example 16

A phenolic resin based carbon fibre paper (produced by the Gun-Ei Chemical industry Co., "CP-22B") was employed. The carbon fibre paper, and the short carbon fibre and polymer material used, are shown in Table 1.

Example 17

Carbon fibre paper was obtained in the same way as in Example 2, excepting that there was used a mixture of PAN-based short carbon fibre and pitch-based short carbon fibre of weight ratio 1:1, the carbon fibre paper, and the short carbon fibres and polymer material used, are shown in Table 1.

Examples 18 to 20

Carbon fibre paper was obtained in the same way as in Example 2, excepting that short fibre comprising a pitch-based carbon fibre was used. The carbon fibre paper, and the short carbon fibre and polymer material used, are shown in Table 1.

Example 21

Carbon fibre paper was obtained in the same way as in Example 8 excepting for the length of the short carbon fibre. The length of the short carbon fibre and the number of dispersion irregularities are shown in Table 1. From Table 1, it is clear that the number of dispersion irregularities is reduced by shortening the length of the short carbon fibre.

Comparative Example 1

A pitch-based carbon fibre paper was employed (Kureha Carbon Fibre Paper "E-704", produced by the Kureha Chemical Industry Co.). In this carbon fibre paper the short carbon fibre was bound by means of carbon, and the bulk density was 0.13 g/cm$^2$ (catalogue value).

Comparative Example 2

Carbon fibre paper was obtained by heat treating a rayon fibre paper for 1 hour at 300° C. in air, and then heat treating at 2,200° C. in an inert atmosphere.

The properties of the carbon fibre papers in Examples 1 to 20 and Comparative Examples 1 and 2 were measured. The results of the measurements of the properties in Examples 1 to 20 are shown in Table 1. Comparative Examples 1 and 2 were damaged by 2.9 MPa pressure application. In the case of the carbon fibre paper of Comparative Example 1, the carbon which binds the short carbon fibre was damaged by the pressure. In the case of the carbon fibre paper of Comparative Example 2, considerable breakage of the short carbon fibres occurred.

The following can be deduced from the results in Table 1.

The carbon fibre papers of the Examples show little weight reduction following 2.9 MPa pressure application, and the resistance is low.

From a comparison of Examples 1 to 8 and Examples 18 to 20 it is clear that the weight reduction following 2.9 MPa pressure application is lower using short carbon fibre with a high value of σ/(E×D). In particular, there is a very considerable weight reduction of 7% in Example 19.

From a comparison of Examples 3 and 4 and Examples 10 and 11, it is clear that the resistance is lower the smaller the content of the polymer material binding the short carbon fibre.

From a comparison of Examples 1, 2 and 4 and Examples 9 and 11, it is clear that the resistance is greater the lower the weight per unit area of the carbon fibre paper and the lower the thickness when a pressure of 2.9 MPa is applied in the thickness direction.

Again, when the weight reduction following pressure application at 2.9 MPa exceeds 1%, then the feel begins to be softened. It is thought that breakage occurs even in short carbon fibre that does not drop away, and there is an increased possibility of damage due to handling following the pressure application.

Example 22

The carbon fibre paper of Example 2, of dimensions 15 cm×15 cm, placed on a film, was impregnated with a liquid mixture of methanol and 0.056 g of phenolic resin, then the methanol evaporated by forced air drying and carbon fibre paper obtained.

Example 23

The carbon fibre paper of Example 2, of dimensions 15 cm×15 cm, placed on a film, was impregnated with a liquid mixture of methanol, 0.005 g of short carbon fibre of length 3 mm and thickness 7 mm and 0.056 g or phenolic resin, then the methanol evaporated by forced air drying and carbon fibre paper obtained.

Example 24

Carbon fibre paper was obtained in the same way as in Example 23 excepting that there was used short carbon fibre of numerical average length 30 $\mu$m and thickness 7 $\mu$m.

Example 25

Carbon fibre paper was obtained in the same way as in Example 23 excepting that there was used 0.001 g of short carbon fibre of length 1.5 mm and thickness 7 $\mu$m.

Example 26

Carbon fibre paper was obtained in the same way as in Example 23 excepting that there was used 0.003 g of short carbon fibre of average length 1.5 mm and thickness 7 $\mu$m.

Comparative Example 3

Carbon fibre paper was obtained in the same way as in Example 23 excepting that there was used short carbon fibre of length 1.5 mm and thickness 7 $\mu$m.

Comparative Example 4

Carbon fibre paper was obtained in the same way as in Example 23 excepting that there was used the carbon fibre paper of Example 21 instead of the carbon fibre paper of Example 2, and there was used 0.07 g of short carbon of length 1.5 mm and thickness 7 $\mu$m.

As a result of observation of the cross-sections of the carbon fibre papers from Examples 22 to 25 and Comparative Examples 3 and 4 by eye, there were observed to be numerous short carbon fibres at an angle of 45° or more from the plane of the carbon fibre paper in the case of Comparative Examples 3 and 4, while hardly any were to be seen in the case of Examples 22 to 25.

With regard to Examples 22 to 25 and Comparative Examples 3 and 4, taking the thickness as X mm, the thickness at the time of 2.9 MPa pressure application as Y mm, the average length of the carbon fibres excluding those of length of (Y+0.2) mm or below as Z, and the length of the short carbon fibre as W mm, the proportion of short carbon fibres satisfying the relation W≧5X amongst the short fibres but excluding those of length of (Y+0.1) mm or below was as shown in Table 1.

The following measurement was carried out as a test to simulate the piercing of the polymer electrolyte membrane by short carbon fibre oriented in the thickness direction is of the current collector.

Two glassy carbon plates of length 200 mm and width 50 mm were placed crossing one another, and carbon fibre paper was interposed in the region of cross-over of the two carbon plates. At this time, the face of one of these glassy carbon sheets in contact with the carbon fibre paper was coated with 0.003 g/m$^2$ of silicone grease (Silicone Compound HVG, produced by the Toray Dow Corning Silicone Co.). Furthermore, to one lengthwise direction end of each of the two glassy carbon sheets there was connected a terminal for current supply and at the other end there was connected a terminal for voltage measurement. Pressure was applied such that the glassy carbon sheets between which the carbon fibre paper had been sandwiched exerted a pressure of 12 kPa on said carbon fibre paper, and the voltage was measured along with a current flow of 30 mA between the two glassy carbon plates.

The voltage measurement results are shown in Table 1.

In the case of Comparative Examples 3 and 4, the voltage was lowered due to the two effects of penetration of the silicone grease layer and penetration of the carbon fibre paper by short carbon fibres of length 1.5 mm disposed in the thickness direction of the carbon fibre paper. In the case of Example 23, the length of the short carbon fibre impregnated along with the phenol resin was long at 3 mm, so it is thought that it was not possible for the fibre to form a large angle in terms of the carbon fibre paper plane, and while there is penetration of the carbon fibre paper due to the short carbon fibres of length 3 mm, no penetration of silicone grease layer occurs.

With the current collector for a polymer electrolyte fuel cell of the present invention, it is possible to prevent short-circuits through the polymer electrolyte membrane due to the short carbon fibres and to prevent damage to the carbon fibre paper by applied pressure both during electrode production and during cell operation and, furthermore, it is possible to achieve a comparatively low resistance in the thickness direction at the time of pressure application.

Such carbon fibre paper can be used as a current collector, as it is, or it can be employed as a current collector following post-treatment of the carbon fibre paper.

Industrial Utilization Potential

The current collector for a polymer electrolyte fuel cell of the present invention is inexpensive and, moreover, it is possible to prevent short circuits caused by short carbon fibre through the polymer electrolyte membrane. Furthermore, it is possible to prevent the short carbon fibre breakage which occurs at the time of pressure application or damage due to the failure of the binding by the polymer material. Consequently, there is obtained a polymer electrolyte fuel cell with little short circuiting due to the current collector, little increase in resistance and little lowering of the diffusion/permeation properties.

What is claimed is:

1. A carbon fiber paper for a polymer electrolyte fuel cell, comprising carbon fibers bound with a polymer material, wherein, taking the carbon fiber paper as having a thickness of X mm, the thickness of the carbon fiber paper when 2.9 MPa pressure is applied as Y mm and taking the carbon fibers as having a length of W mm, at least 95% of the carbon fibers excluding those of a length of (Y+0.1) mm or less satisfy the relationship W≧5X.

2. A carbon fiber paper for a polymer electrolyte fuel cell according to claim 1, wherein at least 98% of the carbon fibers excluding those of length (Y+0.1) mm or less satisfy the relationship W≧5X.

3. A carbon fiber paper for a polymer electrolyte fuel cell according to claim 1, wherein, taking the carbon excluding those of length (Y+0.1) mm or less as having an average length of Z mm, the relationship Z≧5X is satisfied.

4. A carbon fiber paper for a polymer electrolyte fuel cell according to claim 1, wherein the carbon fibers are substantially randomly oriented within a two dimensional plane.

5. A carbon fiber paper for a polymer electrolyte fuel cell according to claim 1, wherein the carbon fibers have a diameter D ($\mu$m), a tensile strength σ (MPa) and a tensile modulus E (MPa) that satisfy the following relationship:

$$\sigma/(E \times D) \geq 0.5 \times 10^{-3}.$$

6. A carbon fiber paper for a polymer electrolyte fuel cell according to claim 5, wherein the carbon fibers have an average length of at least 4.5 mm and at least seven times the thickness of the carbon fiber paper, and the following relationship is satisfied:

$$\sigma/(E \times D) \geq 1.1 \times 10^{-3}.$$

7. A carbon fiber paper for a polymer electrolyte fuel cell according to claim 1, wherein the carbon fiber paper experiences a reduction in weight per unit area of no more than 3% when a uniform pressure of 2.9 MPa is applied for 2 minutes in a thickness direction of the carbon fiber paper and then the pressure is released.

8. A carbon fiber paper for a polymer electrolyte fuel cell according to claim 1, wherein the carbon fibers are fibers of a polyacrylonitrile-based carbon fiber.

9. A carbon fiber paper for a polymer electrolyte fuel cell according to claim 1, wherein the carbon fibers have a diameter of no more than 20 $\mu$m and a volume resistivity in a lengthwise direction of no more than 200 $\mu\Omega$.m.

10. A carbon fiber paper for a polymer electrolyte fuel cell according to claim 1, having a resistance of no more than 50 $\mu\Omega$.cm$^2$ when a uniform pressure of 2.9 MPa is applied.

11. A carbon fiber paper for a polymer electrolyte fuel cell according to claim 1, having a thickness of 0.02 to 2.0 mm and a density of 0.3 to 0.8 g/cm$^3$ when a uniform pressure of 2.9 MPa is applied.

12. A carbon fiber paper for a polymer electrolyte fuel cell according to claim 1, having a weight per unit area of 10 to 100 g/m$^2$.

13. A carbon fiber paper for a polymer electrolyte fuel cell according to claim 1, wherein the polymer material is 2 to 30 wt % of the carbon fiber paper.

14. A carbon fiber paper for a polymer electrolyte fuel cell according to claim 1, further comprising carbon particles having a particle size of no more than 3 $\mu$m.

15. A unit for a polymer electrolyte fuel cell, comprising a plurality of catalyst layers and a plurality of current collectors comprising a carbon fiber paper comprising carbon fibers bound with a polymer material, wherein, taking the carbon fiber paper as having a thickness of X mm, the thickness of the carbon fiber paper when 2.9 MPa pressure is applied as Y mm and taking the carbon fibers as having a length of W mm, at least 95% of the carbon fibers excluding those of a length of (Y+0.1) mm or less satisfy the relationship W≧5X.

16. A polymer electrolyte fuel cell comprising a plurality of units according to claim 15.

17. A moving body which is driven by a polymer electrolyte fuel cell according to claim 16.

18. The polymer electrolyte fuel cell according to claim 16, wherein each of said plurality of units further comprises a polymer electrolyte membrane.

19. The polymer electrolyte fuel cell according to claim 18, wherein the polymer electrolyte membrane is made of a fluoropolymer cation exchange resin.

20. The polymer electrolyte fuel cell according to claim 19, wherein the polymer electrolyte membrane has a thickness of about 0.05 to 0.15 mm.

* * * * *